US008997094B2

(12) United States Patent
Bosch et al.

(10) Patent No.: US 8,997,094 B2
(45) Date of Patent: Mar. 31, 2015

(54) MIGRATING VIRTUAL MACHINES BETWEEN COMPUTING DEVICES

(75) Inventors: Hendrikus G. P. Bosch, Aalsmeer (NL); Jan Medved, Pleasanton, CA (US)

(73) Assignee: Pulse Secure, LLC, San Jose, CA (US)

( * ) Notice: Subject to any disclaimer, the term of this patent is extended or adjusted under 35 U.S.C. 154(b) by 98 days.

(21) Appl. No.: 13/537,526

(22) Filed: Jun. 29, 2012

(65) Prior Publication Data
US 2014/0007089 A1 Jan. 2, 2014

(51) Int. Cl.
G06F 21/53 (2013.01)
G06F 9/48 (2006.01)
G06F 9/50 (2006.01)

(52) U.S. Cl.
CPC ............ *G06F 9/4856* (2013.01); *G06F 9/5077* (2013.01)
USPC ................. 718/1; 709/221; 709/223; 709/226

(58) Field of Classification Search
None
See application file for complete search history.

(56) References Cited

U.S. PATENT DOCUMENTS

| | | | | |
|---|---|---|---|---|
| 6,337,861 | B1 * | 1/2002 | Rosen | 370/389 |
| 8,533,320 | B2 * | 9/2013 | Tsirkin | 709/224 |
| 8,640,127 | B2 * | 1/2014 | Gracin | 718/1 |
| 2005/0013295 | A1 * | 1/2005 | Regan et al. | 370/389 |
| 2007/0186212 | A1 * | 8/2007 | Mazzaferri et al. | 718/1 |
| 2009/0157882 | A1 * | 6/2009 | Kashyap | 709/227 |
| 2010/0115080 | A1 * | 5/2010 | Kageyama | 709/223 |
| 2011/0087774 | A1 * | 4/2011 | Pope et al. | 709/224 |
| 2011/0153715 | A1 * | 6/2011 | Oshins et al. | 709/203 |
| 2012/0137287 | A1 * | 5/2012 | Pang et al. | 718/1 |
| 2012/0311568 | A1 * | 12/2012 | Jansen | 718/1 |
| 2014/0215010 | A1 * | 7/2014 | Liang et al. | 709/217 |

OTHER PUBLICATIONS

Timothy Wood, "CloudNet: A Platform for Optimized WAN Migration of Virtual Machines", University of Massachusetts, Technical Report 2010-002.*
Deering, S. "ICMP Router Discovery Messages" Network Working Group, Request for Comments: 1256, Sep. 1991, 19 pgs.
Perkins, C. "IP Mobility Support for IPv4" Network Working Group, Request for Comments: 3344, Aug. 2002, 99 pgs.
Perkins, C. "IP Mobility Support for IPv4, Revised" Internet Engineering Task Force (IETF), Request for Comments: 5944, Nov. 2010, 100 pgs.

(Continued)

*Primary Examiner* — Lewis A Bullock, Jr.
*Assistant Examiner* — Wynuel Aquino
(74) *Attorney, Agent, or Firm* — Shumaker & Sieffert, P.A.

(57) ABSTRACT

In one example, a system includes a first computing device configured to execute a virtual machine, wherein the virtual machine is communicatively coupled to a virtual private network (VPN) via a first attachment circuit using a first set of network parameters, stop execution of the virtual machine, and create checkpoint data for the virtual machine, and a second computing device configured to execute the virtual machine, using at least some of the checkpoint data, and to cause the virtual machine to become communicatively coupled to the VPN via a second attachment circuit using a second set of network parameters different from the first set of network parameters. The system may further include a first provider edge (PE) routing device communicatively coupled to the first computing device via the first attachment circuit, and a second PE routing device communicatively coupled to the second computing device via the second attachment circuit.

33 Claims, 4 Drawing Sheets

(56) References Cited

OTHER PUBLICATIONS

Rosen et al. "BGP/MPLS IP Virtual Private Networks (VPNs)" Network Working Group, Request for Comments: 4364, Feb. 2006, 48 pgs.

Marques et al. "End-system support for BPG-signaled IP/VPNs" Network Working Group, Internet-Draft, Oct. 6, 2011, 16 pgs.

Xu, X. "Virtual Subnet: A Scalable Data Center Interconnection Solution" Network Working Group, Internet Draft, Aug. 27, 2011, 11 pgs.

\* cited by examiner

MIGRATING VIRTUAL MACHINES BETWEEN COMPUTING DEVICES

TECHNICAL FIELD

This disclosure relates to computer networks and, more particularly, to management of network devices within computer networks.

BACKGROUND

A data center is a specialized facility that houses web sites, provides data serving and backup, and/or other network-based services for subscribers. For example, data centers are often used to provide software as a service (SaaS), platform as a service (PaaS), and/or infrastructure as a service (IaaS), which are generally referred to as cloud computing services. A relatively simple form of data center generally includes a single facility that hosts infrastructure equipment, such as networking and storage systems, redundant power supplies, and environmental controls. Cloud services may be provided by multiple geographically dispersed data centers.

Computing devices of data centers provide various services to client devices. Typically, these computing devices are configured to execute a hypervisor, which executes various operating systems (typically referred to as "guest operating systems,") and one or more applications execute over each of the guest operating systems. These applications include applications for providing services to client devices, such as data storage and retrieval services. Collectively, one guest operating system and the applications executing over that guest operating system are referred to as a "virtual machine." Thus, the hypervisor of a computing device may execute a plurality of virtual machines. Moreover, a data center may include one or more computing devices, each executing a plurality of virtual machines.

In some cases, virtual machines hosted on computing devices of separate data centers may be communicatively coupled, e.g., via a virtual private network (VPN). In this manner, client devices can connect to the VPN and access any of the virtual machines connected to the VPN. Thus, data stored to the VPN may in fact be stored in separate hardware devices at disparate physical locations, e.g., within separate data centers.

Administrators of the data centers may wish to move virtual machines from one data center to another. For example, administrators may move a computing device hosting the virtual machines to perform maintenance on the computing device. As another example, administrators may move a virtual machine to a computing device that is closest to client devices that use services provided by the virtual machine most often. Typically, moving a virtual machine from one data center or another, or from one computing device to another, requires saving a state of an operating system of the virtual machine, then restarting the virtual machine from the saved state on the destination computing device.

SUMMARY

In general, this disclosure describes techniques for migrating virtual machines between computing devices. In some cases, a saved state of a virtual machine may not include sufficient information for the virtual machine to become active on a destination computing device. For example, a network stack of a guest operating system of the virtual machine may need to be rebuilt, e.g., when the destination computing device has a different attachment circuit for attaching to a virtual private network than an original computing device from which the virtual machine was moved. Accordingly, this disclosure provides techniques for rebuilding a network stack of a guest operating system after the virtual machine has been moved.

In one example, a method includes, after execution of a virtual machine by a first computing device has stopped, wherein the virtual machine is communicatively coupled to a virtual private network (VPN) via a first attachment circuit using a first set of network parameters while executed by the first computing device, receiving, by a second computing device, checkpoint data for the virtual machine, executing, by the second computing device, the virtual machine using at least some of the checkpoint data, and causing the virtual machine to become communicatively coupled to the VPN via a second attachment circuit using a second set of network parameters different from the first set of network parameters.

In another example, a device includes a network interface and a control unit configured to execute a virtual machine using at least some checkpoint data for the virtual machine, after execution of the virtual machine by a separate computing device has stopped, wherein the virtual machine is communicatively coupled to a virtual private network (VPN) via a first attachment circuit using a first set of network parameters while executed by the separate computing device, wherein the control unit is configured to execute the virtual machine and to cause the virtual machine to become communicatively coupled, using the network interface, to the VPN via a second attachment circuit having a second set of network parameters different from the first set of network parameters.

In another example, a first computing device configured to execute a virtual machine, wherein the virtual machine is communicatively coupled to a virtual private network (VPN) via a first attachment circuit using a first set of network parameters, to stop execution of the virtual machine, and to create checkpoint data for the virtual machine, and a second computing device configured to execute the virtual machine using at least some of the checkpoint data, and to cause the virtual machine to become communicatively coupled to the VPN via a second attachment circuit using a second set of network parameters different from the first set of network parameters. The system may further include a first provider edge (PE) routing device communicatively coupled to the first computing device via the first attachment circuit, and a second PE routing device communicatively coupled to the second computing device via the second attachment circuit. Moreover, the system may include a network management system configured to cause the virtual machine to migrate from the first computing device to the second computing device and to send a message to the second PE routing device indicating that the virtual machine has migrated to the second computing device.

In another example, a computer-readable medium, such as a computer-readable storage medium, contains, e.g., is encoded with, instructions that cause a processor of a computing device to, after execution of a virtual machine by a separate computing device has stopped, wherein the virtual machine is communicatively coupled to a virtual private network (VPN) via a first attachment circuit using a first set of network parameters while executed by the separate computing device, receive checkpoint data for the virtual machine, execute the virtual machine using at least some of the checkpoint data, and cause the virtual machine to become communicatively coupled to the VPN via a second attachment circuit using a second set of network parameters different from the first set of network parameters.

In another example, a method includes determining, by a provider edge (PE) routing device, that a virtual machine has migrated from a first computing device to a second computing device, wherein the virtual machine is communicatively coupled to a virtual private network (VPN) via a first attachment circuit using a first set of network parameters while executed by the first computing device, and wherein the PE routing device is communicatively coupled to the second computing device, and in response to determining that the virtual machine has migrated to the second computing device, sending an Internet control message protocol (ICMP) router advertisement message to the second computing device including a second set of network parameters for causing the virtual machine to become communicatively coupled to the VPN via a second attachment circuit, wherein the second set of network parameters are different from the first set of network parameters, and wherein the second attachment circuit couples the virtual machine to the PE routing device.

The details of one or more examples are set forth in the accompanying drawings and the description below. Other features, objects, and advantages will be apparent from the description and drawings, and from the claims.

DETAILED DESCRIPTION

Figure 1:
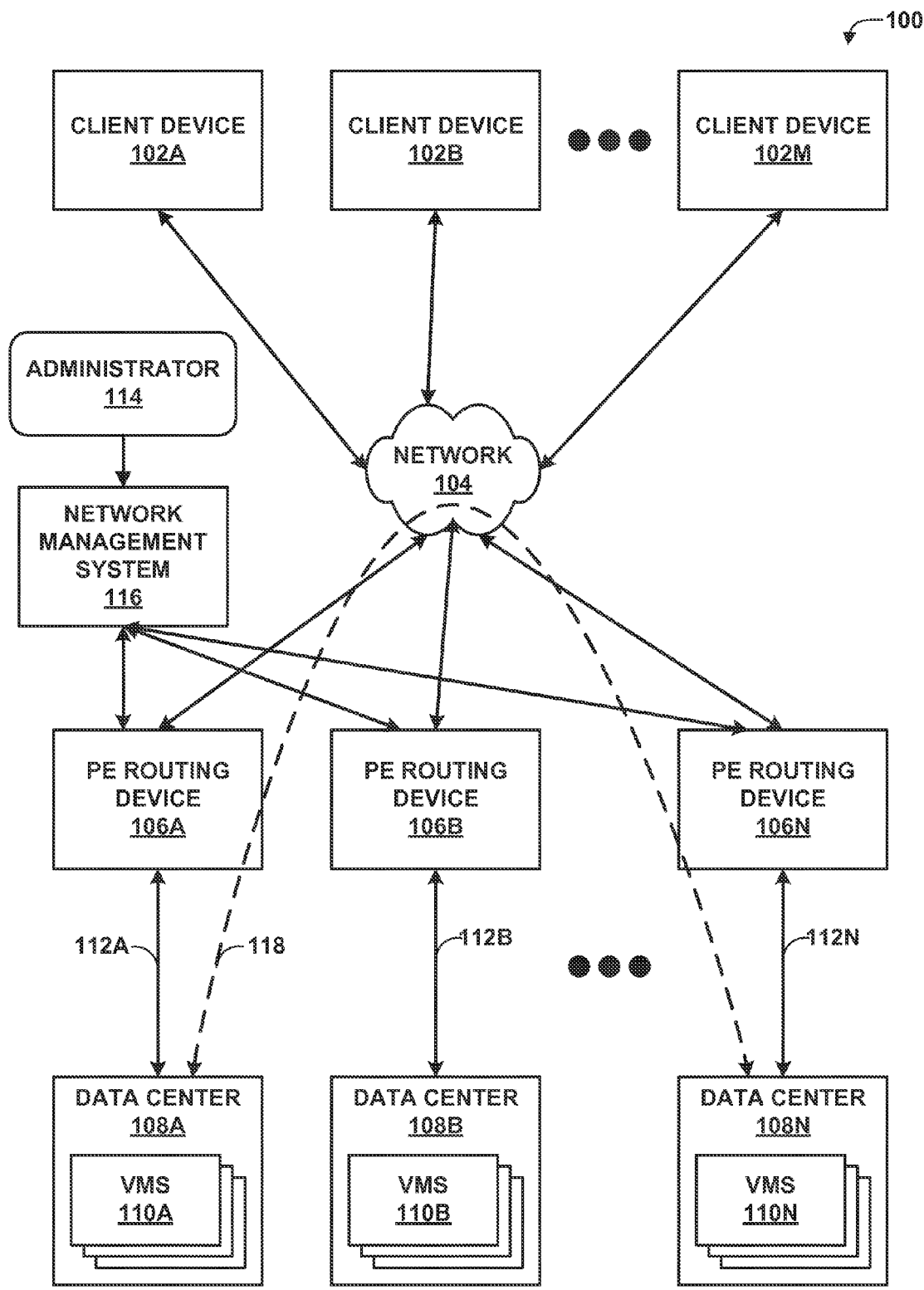
FIG. 1 is a block diagram illustrating an example system in which virtual machines (VMs) can be moved between data centers in accordance with the techniques of this disclosure.

FIG. 1 is a block diagram illustrating an example system 100 in which virtual machines (VMs) can be moved between data centers in accordance with the techniques of this disclosure. System 100 includes client devices 102A-102M (client devices 102), network management system 116 (NMS 116), provider edge (PE) routing devices 106A-106N, and data centers 108A-108N (data centers 108). Devices of data centers 108 are communicatively coupled to respective PE routing devices 106 via connections 112A-112N (connections 112). Client devices 102 and PE routing devices 106 are also communicatively coupled via network 104, which may represent the Internet.

In addition, any or all of data centers 108 may form a virtual network at Layer 2 of the open systems interconnection (OSI) model of computer networks. For example, any or all of data centers 108 may form an Internet protocol virtual private network (IP VPN). As shown in the example of FIG. 1, data center 108A and data center 108N are connected to a common VPN 118. VPN 118 may correspond to an IP VPN in accordance with E. Rosen & Y. Rekhter, "BGP/MPLS IP Virtual Private Networks (VPNs)," RFC 4364, February 2006, which is hereby incorporated by reference in its entirety. PE routing devices 106 maintain virtual routing and forwarding (VRF) tables for each VPN. In this manner, PE routing devices 106 isolate routing and forwarding information of a VPN from other VPNs and from general network traffic. Client devices 102 may also connect to a VPN via network 104. Accordingly, network 104 may include network devices, such as routing devices, that also maintain VRFs for the various VPNs.

Figure 2:
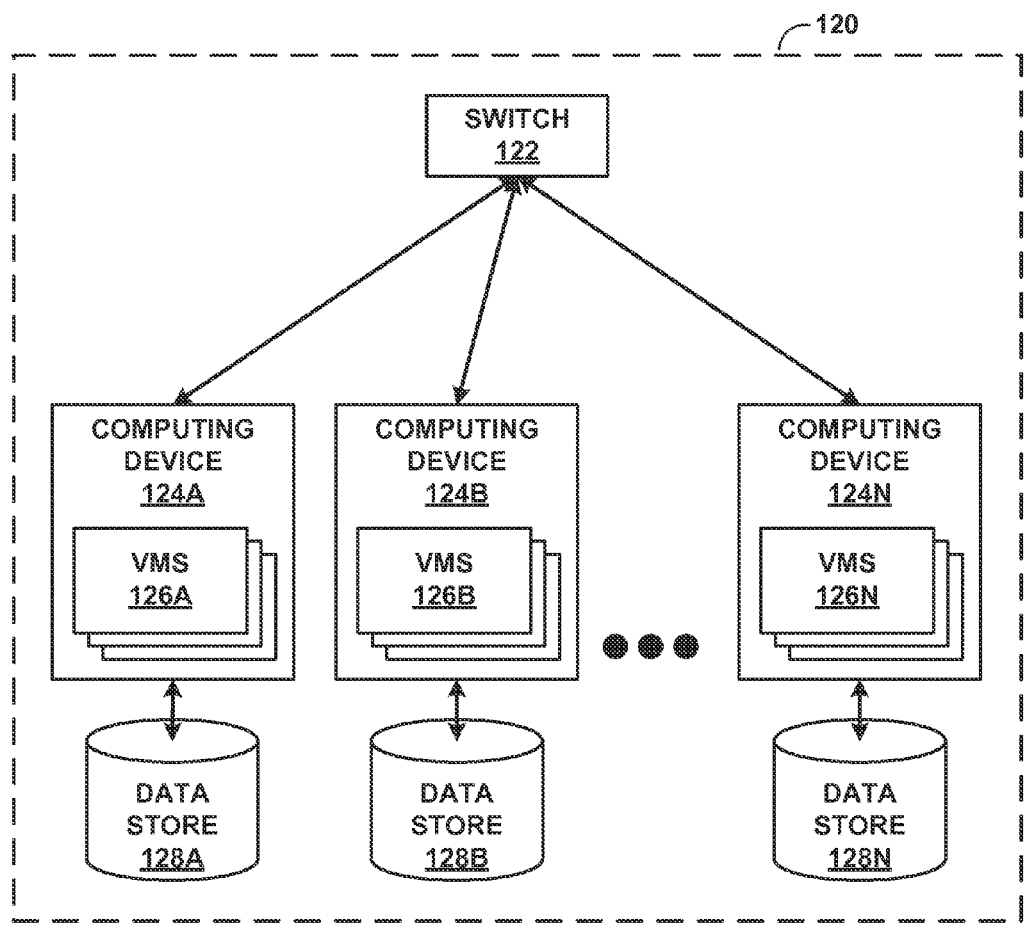
FIG. 2 is a block diagram illustrating an example set of devices included in a data center.

Data centers 108 represent a collection of devices, such as computing devices, interconnected by a Layer 2 switch. An example of such devices is shown in FIG. 2, as described in greater detail below. Computing devices of data centers 108 execute respective sets of VMs 110A-110N (VMs 110). VMs 110 generally execute applications for providing services to client devices 102. For example, VMs 110 allow client devices 102 to store and retrieve data to and from storage devices (not shown) of data center 108.

In general, each of VMs 110 includes an operating system (OS) that provides an application space in which one or more applications execute for providing services to client devices 102. The OSes of VMs 110 are executed by hypervisors of computing devices of data centers 108. Thus, computing devices of data centers 108 may execute a respective operating system, which in turn provides an application space in which the hypervisor executes, and which in turn executes OSes of respective VMs 110. Accordingly, the OSes of VMs 110 may be referred to as "guest OSes," in that these guest OSes are not the operating system of the computing device but provide an interface between resources of the underlying hypervisor and applications executing in application spaces of the guest OSes.

Connections 112 in some cases also represent attachment circuits, e.g., to VPN 118 or another VPN. Different types of attachment circuits for connecting to an IP VPN may be used. For example, connection 112A may represent a virtual local area network (VLAN), whereas connection 112N may represent a generic routing encapsulation (GRE) tunnel. Another example of an attachment circuit is an IP Security (IPSec) tunnel. Alternatively, two or more of the same type of attachment circuits for connecting to an IP VPN may be used, but may differ in that the attachment circuits may have different network parameters. For example, two different VLANs may have different VLAN tags, while two different GREs may have different GRE session keys. In general, guest OSes, such as Linux, hosted on VMs 110 are attached to a Layer 2 VPN, such as VPN 118, via attachment circuits represented by connections 112.

Each of the OSes of VMs 110 maintains its own respective network stack. For example, each of the OSes of VMs 110 may maintain network session data for network sessions with one or more client devices 102 when providing services to client devices 102. VMs 110 are also assigned unique media access control (MAC) addresses and IP addresses, in order to be reachable via network 104. The network stacks include data specific to the respective attachment circuit used to connect to respective PE routing devices 106. Continuing the example above, VMs 110A may maintain data for a VLAN connection to PE routing device 106A via connection 112A, while VMs 110N may maintain data for a GRE tunnel connection to PE routing device 106N via connection 112N.

Network management system 116 generally enables a user, such as administrator 114, to maintain network devices, such as PE routing devices 106 and devices of data centers 108. In accordance with the techniques of this disclosure, administrator 114 may use NMS 116 to move VMs 110 between data centers 108. For example, administrator 114 may cause one of VMs 110A to move from data center 108A to data center 108N. This movement of a VM is also referred to in this disclosure as VM migration. In the example of FIG. 1, migrating one of VMs 110A from data center 108A to data center 108N would allow the migrated VM to remain connected to VPN 118. Administrator 114 may migrate a VM for various reasons, e.g., to perform maintenance on a computing device executing the VM or after determining that one of client devices 102 using services provided by the VM are spatially closer to data center 108N than 108A.

When administrator 114 uses NMS 116 to migrate one of VMs from a computing device of one of data centers 108 to another, NMS 116 provides a message indicating details for this VM migration to a PE routing device. For example, NMS 116 may provide an indication of a MAC address of the VM being migrated, an IP address of the VM being migrated, and an indication of the computing device of the one of data centers 108 to which the VM is being migrated. Specifically, NMS 116 provides this information to the one of PE routing devices 106 to which the destination computing device for the migrating VM is communicatively coupled. For example, when NMS 116 migrates one of VMs 110A to a computing device of data center 108N, NMS 116 provides this information to PE routing device 106N, which is communicatively coupled to the computing device of data center 108N via connection 112N.

PE routing device 106N may then, continuing the example above, update a VRF associated with VPN 118. Specifically, PE routing device 106N may ensure that an output interface associated with the destination computing device of data center 108N is also associated with the MAC address and/or IP address of the migrated virtual machine. In this manner, when PE routing device 106N receives network traffic of VPN 118 destined for the MAC address and/or IP address of the migrated virtual machine, PE routing device 106N can determine to send the network traffic via the network interface connected to the destination computing device for the migrated virtual machine.

In this manner, administrator 114 represents an example of an external party who may decide to move a VM from one attachment point (e.g., computing device of a data center) to another, each of which are connected to the same IP VPN. In this example, administrator 114 may cause a VM to be relocated from one data center to another. By way of VM mobility at the time the VM migration commences, the guest operating system may be suspended and check pointed into a file. The file may then be copied across a network to a receiving VM and re-started at the destination. That is, a destination computing device of a different data center may restart the migrated VM at the check point.

One problem with conventional VM mobility procedures is that as a VM moves from one attachment circuit to another (e.g. VLAN A to VLAN B, GRE tunnel A to GRE tunnel B, or the like), the networking stack of the guest OS of the migrated VM may contain invalid parameters for the new attachment circuit, or an attachment circuit to the IP VPN may be completely non-existent. For instance, as a Linux/VM relocates between two VLANs, the Linux address resolution protocol (ARP) cache may contain Ethernet MAC addresses of the source VLAN that are non-addressable in the destination VLAN. Similarly, as a Linux VM relocates from a VLAN attachment circuit to a GRE attachment circuit (for example, as described in P. Marques et al., "End-system Support for BGP-Signaled IP/VPNs," draft-marques-l3vpn-end-system-00, Network Working Group, Internet Draft, Oct. 6, 2011, available at http://tools.ietforg/html/draft-marques-l3vpn-end-system-00, which is hereby incorporated by reference in its entirety), the GRE tunnel between the Linux IP stack and IP VPN's Virtual Routing and Forwarding (VRF) function needs to be established.

In X. Xu, "Virtual Subnet: A Scalable Data Center Interconnection Solution," draft-xu-virtual-subnet-06, Network Working Group, Internet Draft, Aug. 27, 2011, available at http://tools.ietf.org/html/draft-xu-virtual-subnet-06, it is argued that the Linux/VM sends a gratuitous ARP when the VM arrives at the destination to the receiving Provider Edge (PE). However, the Linux/VM will do no such thing by itself. If networking stacks in migrated guest operating systems are not re-organized after mobility events, ongoing session layer connections, such as transmission control protocol (TCP) sessions, are disrupted or terminated.

As noted above, VMs 110A may maintain data specific to the attachment circuit represented by connection 112A. Moreover, the attachment circuit represented by connection 112N is not necessarily the same type of attachment circuit as the attachment circuit represented by connection 112A. Therefore, after migrating a VM from a computing device of data center 108A to a computing device of data center 108N, a network stack of the migrated VM may need to be rebuilt to accommodate a new type of attachment circuit. Whereas a conventional guest operating system may continue exactly where it was suspended and not execute any mobility-specific functionality, this disclosure provides techniques for a guest OS to determine that it has been moved to a new attachment point (e.g., a new one of data centers 108), and in response, to connect to the attachment circuit (e.g., one of connections 112) to which the new attachment point is connected.

The problem of guest operating system mobility by way of VMs today has been previously addressed at Layer 2. By defining a large Ethernet across data centers, potentially connected together by way of a Layer 2 VPN, a networking solution has been formed that is effectively a single attachment circuit. Given that every Layer 2 Ethernet address is addressable from any point in this attachment circuit, a guest operating system's ARP cache does not get inconsistent when the VM relocates. A potential downside of this approach is that one needs to create potentially large Ethernets with associated spanning trees, potentially across multiple data centers. To keep the spanning tree consistent, a fair amount of signaling is required. Such VM mobility solutions using a single Layer 2 technology does not enable mixing attachment circuit types: for instance, one cannot move a VM and guest operating system from a VLAN attachment circuit to a GRE attachment circuit: it is difficult to see how to disconnect a Linux/VM from a VLAN and re-attach the VM by way of a GRE tunnel, IPSEC tunnel, or other Layer 2 attachment type. This disclosure provides techniques in which a VM can be migrated between attachment points having different types of attachment circuits.

In accordance with the techniques of this disclosure, administrator 114 may use NMS 116 to cause the PE routing device to which the computing device of the data center to which a VM is moved to send a router advertisement message to the computing device of the data center to which the VM is moved. The router advertisement message may correspond to an Internet control message protocol (ICMP) message in accordance with S. Deering, "ICMP Router Discovery Messages," RFC 1256, September 1991; C. Perkins, "IP Mobility Support for IPv4," RFC 3344, August 2002; or C. Perkins, "IP Mobility Support for IPv4, Revised," RFC 5944, November 2010, which are hereby incorporated by reference in their respective entireties. The router advertisement message includes all parameters necessary for the guest OS of the migrated VM to re-attach to VPN 118, including an indication of an attachment circuit and parameters to use to connect to the attachment circuit. NMS 116 may send the ICMP router advertisement message to the VM by sending the ICMP router advertisement message to the MAC address and/or IP address of the VM. The MAC address and IP address of the VM typically do not change after moving the VM from one of data centers 108 to another.

For example, if the attachment circuit is a VLAN, the parameters may include VLAN tags and instructions on how to update the address resolution protocol (ARP) cache of the guest operating system. As another example, if the attachment circuit is a GRE tunnel, the router advertisement may include parameters for the PE "home agent" address as per RFC3344, the protocol to use to establish the GRE attachment circuit (e.g. client Mobile IP, XMPP, etc.), potentially a new default gateway for the VM, and a GRE session key. The router advertisement may additionally include instructions for a migrated relocated guest operating system to re-authenticate the attachment circuit to the IP VPN by way of IEEE 802.1x or other authentication protocols. The latter can be needed to establish a secure attachment circuit between guest operating system and IP VPN.

With respect to the example above, one of VMs 110A may be migrated to a computing device of data center 108N. Connection 112N may represent a GRE tunnel, while connection 112A may represent a VLAN. Accordingly, administrator 114 may use NMS 116 to cause PE routing device 106N to send the migrated VM, executing on a computing device of data center 108N, parameters for connecting to the GRE tunnel represented by connection 112N, as discussed above. After receiving these parameters, the OS of the migrated VM may rebuild its network stack to connect to the GRE tunnel, represented by connection 112N, to PE routing device 106N. Alternatively, if one of VMs 110N were to be migrated to a computing device of data center 108A, administrator 114 may use NMS 116 to cause PE routing device 106A to send the migrated VM parameters for connecting to the VLAN represented by connection 112A, as discussed above. After receiving these parameters, the OS of the migrated VM may rebuild its network stack to connect to the VLAN, represented by connection 112A, to PE routing device 106A.

In this manner, the techniques of this disclosure may extend a guest operating system of a VM with a mobility function (e.g., a software agent) whose task is to re-attach the guest operating system to the IP VPN after the VM has relocated to a new attachment point in the IP VPN. As a relocated guest operating system is installed in the destination computing device to restart the migrated VM, the PE to which the VM is (or will be) connected submits a router advertisement ICMP message, akin to client Mobile IP mobility events, to the relocated guest operating system and VM, as discussed above.

Thus, the techniques of this disclosure allow a VM to be relocated between computing devices of different data centers connected to an IP VPN via different types of attachment circuits. One potential advantage of extending a guest operating system with a mobility agent is that this allows a migrated guest operating system of a VM to re-establish an attachment circuit after the VM has been migrated. Because networking stack internal parameters may become inconsistent after such a move, a mobility agent can be used to patch up the parameters for connecting to the PE via the attachment circuit.

The PE hosting the migrated VM may solicit the ICMP router advertisement via any medium by which the VM and guest operating system are capable of receiving datagrams. For example, the PE may solicit the ICMP router advertisement to the VM and guest operating system by sending a unicast message to the IP address and MAC address associated with the migrated VM.

System 100 of FIG. 1 represents an example of a system including a first computing device configured to execute a virtual machine, wherein the virtual machine is communicatively coupled to a virtual private network (VPN) via a first attachment circuit using a first set of network parameters, to stop execution of the virtual machine, and to create checkpoint data for the virtual machine, and a second computing device configured to execute the virtual machine using at least some of the checkpoint data, and to cause the virtual machine to become communicatively coupled to the VPN via a second attachment circuit using a second set of network parameters different from the first set of network parameters.

FIG. 2 is a block diagram illustrating an example set of devices included in data center 120. Data centers 108 of FIG. 1 may each include components similar to those of data center 120 of FIG. 2. In the example of FIG. 2, data center 120 includes switch 122, computing devices 124A-124N (computing devices 124), and data stores 128A-128N (data stores 128). Each of computing devices 124 executes a respective set of VMs 126A-126N (VMs 126). For example, each of computing devices 124 may execute a respective hypervisor, which allows computing devices 124 to execute a plurality of virtual machines, each including its own operating system (referred to herein as a "guest" operating system) and application space in which one or more applications execute over the guest operating system.

Computing devices 124 are also coupled to respective data stores 128. In various examples, each of data stores 128 may include one or a plurality of physical storage units, e.g., hard drives, flash drives, or other storage media. Moreover, in some examples, one or more of data stores 128 may be connected to a plurality of computing devices 124. In general, computing devices 124 maintain data stored in respective data stores 128. For example, VMs 126 executed by computing devices 124 may provide services for accessing (retrieving data from and/or storing data to) respective data stores 128.

Computing devices 124 are interconnected (that is, communicatively coupled) via switch 122. Switch 122 represents an example of a Layer 2 device for connecting a plurality of devices at Layer 2 of the OSI model. Switch 122 may execute a Layer 2 protocol, such as Ethernet, to achieve this interconnection. In this manner, computing devices 124 and switch 122 may form a physical Layer 2 network. Thus, computing devices 124 may access resources, such as data of data stores 128, managed by other computing devices 124 by communicating via switch 122. For example, computing device 124N may retrieve data of data store 128A by sending a request for the data to computing device 124A via switch 122.

In some examples, one or more of VMs 126 may form a virtual private network (VPN). Thus, rather than forming a physical Layer 2 network, these VMs may form a virtual private network (VPN). APE router (not shown in FIG. 2) may maintain a VRF table associated with the VPN, and the VMs may be communicatively coupled to the VPN using a first type of attachment circuit, such as a VLAN, a GRE tunnel, an IPSec tunnel, or other type of attachment circuit. The VRF may include addresses for the VPN, and the PE router generally uses a network protocol associated with the attachment circuit to determine whether network data should be routed and forwarded according to the VRF or according to a general routing and forwarding table.

Moreover, one of VMs 126 may be migrated to a computing device of a separate data center, and/or one of computing devices 124 may be configured to begin executing a migrated virtual machine from a separate data center. Attachment circuits for migrated virtual machines may differ between computing devices of different data centers. For example, a source computing device may provide a VLAN attachment circuit to communicate with devices of a VPN, while a destination computing device may provide a GRE tunnel to communicate with devices of the VPN.

In accordance with the techniques of this disclosure, when one of computing devices 124 receives a migrated virtual machine, the one of computing devices 124 may also receive network parameters for the migrated virtual machine. The computing device may begin executing the migrated virtual machine and provide the network parameters to the migrated virtual machine to cause the migrated virtual machine to rebuild a network stack for an attachment circuit for the one of computing devices 124. In this manner, the migrated virtual machine can become reconnected to the VPN using a different type of attachment circuit.

Figure 3:
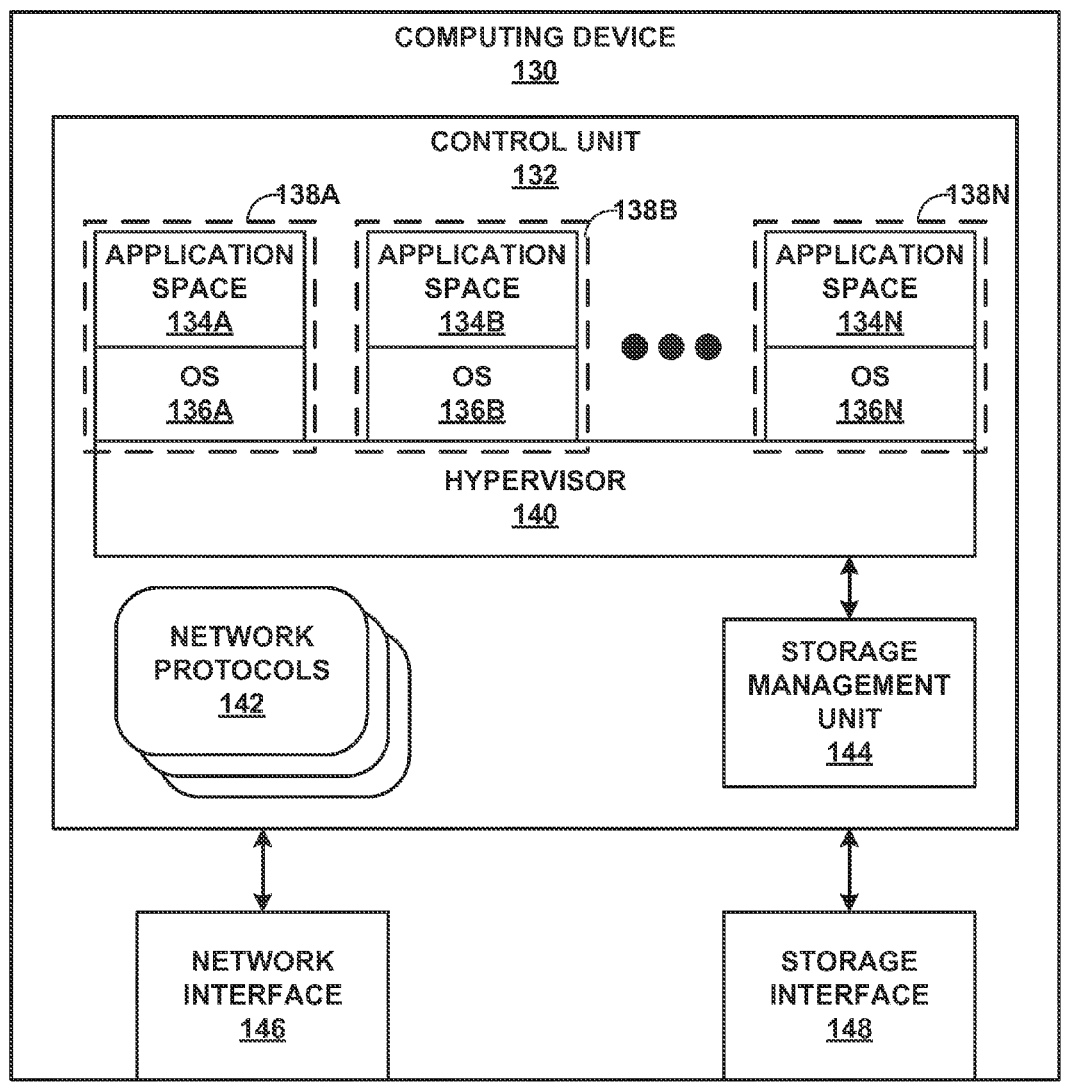
FIG. 3 is a block diagram illustrating an example set of components of a computing device.

FIG. 3 is a block diagram illustrating an example set of components of computing device 130. Computing devices of various data centers, such as computing devices 124 of data center 120 (FIG. 2) and/or computing devices of data centers 108 (FIG. 1) may include components similar to those of computing device 130. In the example of FIG. 3, computing device 130 includes control unit 132, network interface 146, and storage interface 148.

Control unit 132 may include hardware, software, firmware, or a combination thereof for performing the techniques attributed to control unit 132. When including software or firmware, it should be understood that requisite hardware may also be provided, e.g., one or more processing units and/or a computer-readable medium, such as a hard disk, flash memory, optical media, magnetic media, read-only memory (ROM), or a combination thereof. The processing units may be hardware-based, in that the processing units may include one or more microprocessors, field programmable gate arrays (FPGAs), digital signal processors (DSPs), logic circuitry, or any combination thereof.

In the example of FIG. 3, control unit 132 includes hypervisor 140, network protocols 142, and storage management unit 144. Storage management unit 144 represents a unit for interacting with storage media via storage interface 148, e.g., for reading data from and/or writing data to a storage medium. Storage interface 148 may comprise, for example, a universal serial bus (USB), a serial ATA (SATA) interface, a Fibre Channel interface, a FireWire interface, or other interface for coupling computing device 130 to a storage medium. In some examples, data to be stored to a storage medium may be communicated via network interface 146, rather than storage interface 148. Storage interface 148 may include requisite hardware, such as a physical port to which a physical cable can be connected and, potentially, associated logic circuitry, for storing data to a computer-readable medium.

Network interface 146 allows computing device 130 to communicate over a network. Network interface 146 may support wired and/or wireless network communication. Network interface 146 generally converts electrical and/or optical signals communicated across the network to or from data used by control unit 132. Network interface 146, accordingly, provides Layer 1, and in some cases, Layer 2, network functionality. For example, network interface 146 may correspond to a network interface card (NIC), a wireless adaptor for communicating according to an IEEE 802.11-series protocol, or the like.

Network protocols 142 represent protocols for communicating over a network at or above Layer 2 of the OSI model. For example, network protocols 142 may include instructions for establishing or maintaining an attachment circuit, such as a VLAN, a GRE tunnel, an IPSec tunnel, or the like. Control unit 132 may execute one or more network protocols 142 to receive and/or send data across a network, e.g., via network interface 146.

Hypervisor 140 represents an intermediate layer between resources of computing device 130 and virtual machines 138A-138N (virtual machines 138). Thus, virtual machines 138 access resources of computing device 130 via hypervisor 140. Likewise, hypervisor 140 receives input, such as network communications, for virtual machines 138 and provides the input to the appropriate one of virtual machines 138. Each of virtual machines 138 includes a respective one of operating systems (OSes) 136A-136N (OSes 136), which provide respective application spaces 134A-134N (application spaces 134). In this manner, virtual machines 138 may execute one or more applications in the corresponding application spaces 134. The applications may provide various services, such as data storage and/or manipulation services. Because OSes 136 are OSes for virtual machines 138 and not a host OS for computing device 130, OSes 136 may also be referred to as "guest OSes" or "guest operating systems."

In accordance with the techniques of this disclosure, OSes 136 may be communicatively coupled to a VPN via network interface 146. Moreover, computing device 130 represents an example of an attachment point for virtual machines 138 to connect to a VPN. Accordingly, virtual machines 138 may be communicatively coupled to a VPN using a particular type of attachment circuit, such as a VLAN, a GRE tunnel, an IPSec tunnel, or the like.

In some cases, a virtual machine may be migrated to computing device 130. That is, computing device 130 may receive checkpoint data for a virtual machine, as well as a set of instructions for the virtual machine, including an operating system and instructions for one or more applications to be executed in an application space provided by the operating system. Control unit 132 executes the instructions for the operating system and the applications, using the checkpoint data to resume execution from a previous state of the virtual machine, as executed by a separate computing device. During execution by the separate computing device, the virtual machine may have been connected to a VPN by a first type of attachment circuit. However, while executed by control unit 132 of computing device 130, the virtual machine may need to connect to the VPN using a different type of attachment circuit.

Thus, in accordance with the techniques of this disclosure, control unit 132 may receive an Internet control message protocol (ICMP) router advertisement message destined for the migrated virtual machine. Assume, for purposes of example, that the migrated virtual machine is virtual machine 138N. In this example, control unit 132 of computing device 130 would receive the ICMP router advertisement via network interface 146. Hypervisor 140 would then determine a network address for which the ICMP router advertisement message is destined, e.g., a MAC address and/or an IP address, and determine which of virtual machines 138 corresponds to that MAC address and/or IP address. In this example, hypervisor 140 would determine that virtual machine 138N has a MAC address and/or IP address that matches the destination address(es) of the ICMP router advertisement message. Accordingly, hypervisor 140 would provide the ICMP router advertisement message to virtual machine 138N.

Moreover, in accordance with the techniques of this disclosure, each of virtual machines 138 executes an application (e.g., a software agent) tasked with re-attaching the corresponding one of OSes 136 to a VPN, in the event that one of virtual machines 138 is migrated to a different computing device. With respect to the example above, after virtual machine 138N receives the ICMP router advertisement message from hypervisor 140, OS 136N of virtual machine 138N provides the ICMP router advertisement message to this application. This application, in turn, extracts network parameters from the ICMP router advertisement message and uses the extracted network parameters to rebuild a network stack of OS 136N. For example, the application may connect to an existing attachment circuit to a PE routing device to which computing device 130 is communicatively coupled, or establish such an attachment circuit if one does not already exist.

The ICMP router advertisement message generally includes all parameters needed for OS 136N to re-attach to the IP VPN, and may include a list specifying one or more attachment circuits with the appropriate parameters. For a VLAN attachment circuit, the parameters may include VLAN tags and instructions how to update the ARP cache of OS 136N. If the new attachment circuit is a GRE tunnel, the ICMP router advertisement may include parameters for the PE "home agent" address, per RFC3344, the protocol to use to establish the GRE attachment circuit (e.g., client Mobile IP, XMPP, etc.), potentially a new default gateway for virtual machine 138N, and a GRE session key. The ICMP router advertisement may additionally include instructions for OS 136N to re-authenticate the attachment circuit to the IP VPN by way of IEEE 802.1x or other authentication protocols. The latter can be needed to establish a secure attachment circuit between OS 136N and an IP VPN. In this manner, using the network parameters specified in the ICMP router advertisement message, virtual machine 138N may rebuild a network stack of OS 136N and establish or re-establish an attachment circuit to a VPN, to which virtual machine 138N had been attached prior to being migrated to computing device 130.

In some examples, control unit 132 of computing device 130 receives instructions to migrate one of virtual machines 138 (e.g., virtual machine 138A) to a different computing device. In response to such instructions, control unit 132 stores checkpoint data for virtual machine 138A, in this example, where the checkpoint data represents a current state of OS 136A and applications executing in application space 134A. Control unit 132 may then send the checkpoint data to a destination computing device to which virtual machine 138A is being migrated. In some cases, control unit 132 may also provide instructions for OS 136A and applications executing in application space 134A to the destination computing device. As discussed above, the attachment circuit for a VPN to which virtual machine 138A is communicatively coupled while being executed by control unit 132, for connecting to a VPN, may differ from an attachment circuit to which the destination computing device is communicatively coupled. Virtual machine 138A may use the techniques of this disclosure to re-attach to the VPN using a different type of attachment circuit while being executed by the destination computing device.

In this manner, computing device 130 represents an example of a computing device including a network interface and a control unit configured to execute a virtual machine using at least some checkpoint data for the virtual machine, after execution of the virtual machine by a separate computing device has stopped, wherein the virtual machine is communicatively coupled to a virtual private network (VPN) via a first attachment circuit using a first set of network parameters while being executed by the separate computing device. The control unit is configured to execute the virtual machine and to cause the virtual machine to become communicatively coupled, using the network interface, to the VPN via a second attachment circuit having a second set of network parameters different from the first set of network parameters.

Figure 4:
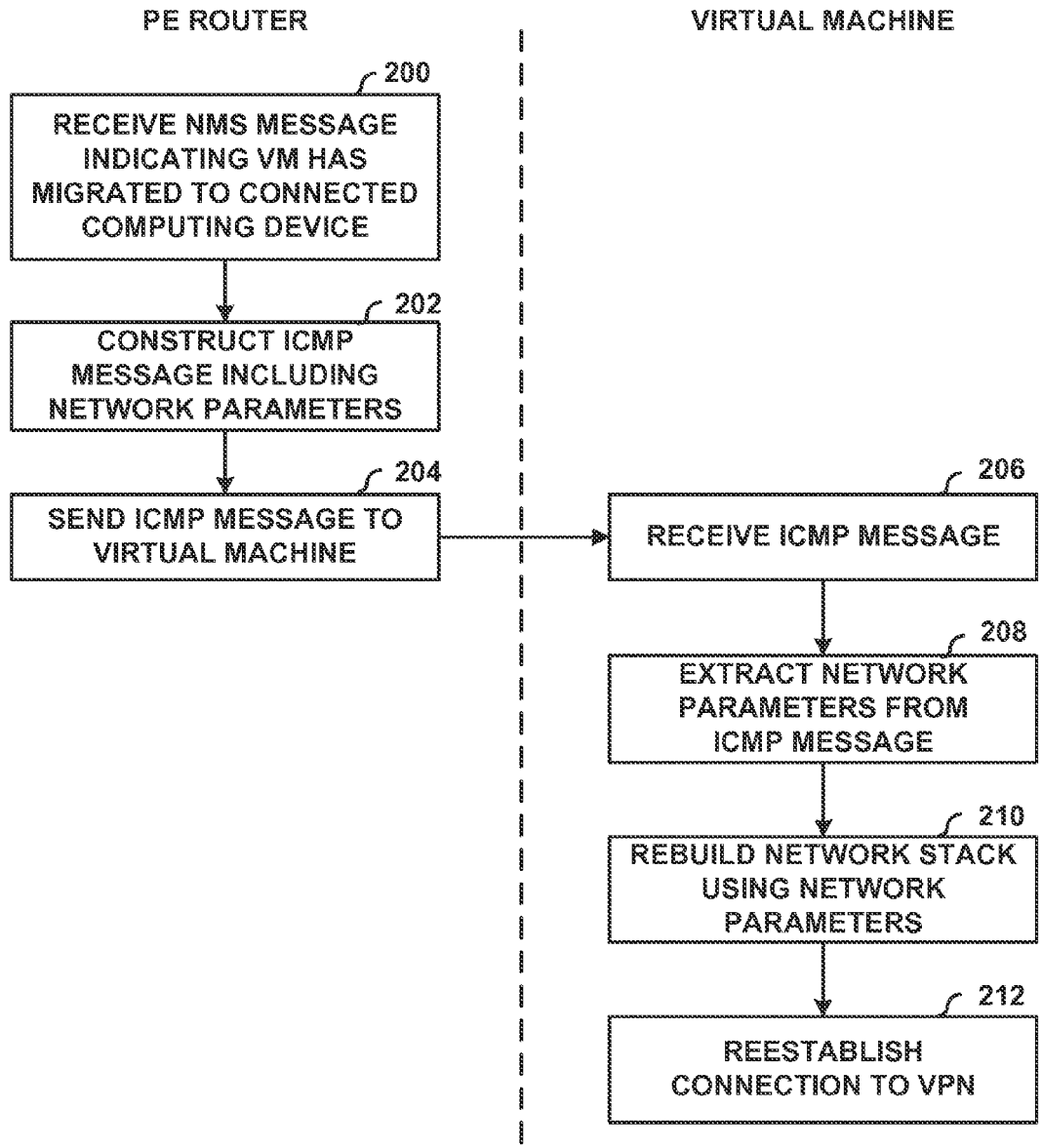
FIG. 4 is a flowchart illustrating an example method for migrating a virtual machine between computing devices that are communicatively coupled to a virtual private network (VPN) using different types of attachment circuits.

FIG. 4 is a flowchart illustrating an example method for migrating a virtual machine between computing devices that are communicatively coupled to a virtual private network (VPN) using different types of attachment circuits. The method of FIG. 4 is described as being performed by a PE router, such as one of PE routing devices 106 (FIG. 1), and a virtual machine, such as one of VMs 110 (FIG. 1), VMs 126 (FIG. 2), or VMs 138 (FIG. 3). In general, it is assumed that the PE router represents a PE router that is communicatively coupled, via an attachment circuit, to a destination computing device for the migrated virtual machine.

For example, with respect to FIG. 1, assuming that a virtual machine is being migrated from a computing device of data center 108A to a computing device of data center 108N, the PE router may correspond to PE routing device 106N, and the attachment circuit may correspond to connection 112N. Furthermore, continuing the example above, connection 112N may represent an attachment circuit of a different type than the attachment circuit represented by connection 112A. Moreover, using this method, the virtual machine may reconnect to VPN 118 after resuming execution on the computing device of data center 108N after migrating from a computing device of data center 108A, and while executing on the computing device of data center 108A, the virtual machine may also have been communicatively coupled to VPN 118.

Initially, the PE router receives a message from a network management system (NMS), such as NMS 116 of FIG. 1, indicating that a virtual machine has migrated to a connected computing device (200). That is, the PE router receives a message indicating that a virtual machine has migrated to a computing device to which the PE router is communicatively coupled. The migrated virtual machine will either establish or attach to the attachment circuit between the destination computing device (that is, the computing device to which the virtual machine has been migrated) and the PE router. The message from the NMS may indicate an IP address and/or a MAC address of the virtual machine, as well as an indication of the destination computing device.

Using this information from the NMS, the PE router may update a VRF associated with the VPN to indicate that traffic destined for the virtual machine is to be forwarded to the destination computing device. In this manner, the PE router may receive traffic of the VPN destined for the virtual machine, and use the VRF associated with the VPN to determine how to forward the traffic destined for the virtual machine.

Moreover, in response to receiving this indication from the NMS, the PE router constructs an ICMP router advertisement message including network parameters for connecting to the attachment circuit between the destination computing device and the PE router (202). As discussed above, the ICMP router advertisement message includes all parameters needed for a guest operating system of the migrated virtual machine to re-attach to the VPN. The PE router then sends the ICMP router advertisement message to the virtual machine (204). For example, the PE router may send the ICMP router advertisement message to the destination computing device, addressed to the MAC address and/or the IP address of the migrated virtual machine.

In this manner, the method of FIG. 4 represents an example of a method including determining, by a provider edge (PE) routing device, that a virtual machine has migrated from a first computing device to a second computing device, wherein the virtual machine is communicatively coupled to a virtual private network (VPN) via a first attachment circuit using a first set of network parameters while executed by the first computing device, and wherein the PE routing device is communicatively coupled to the second computing device, and in response to determining that the virtual machine has migrated to the second computing device, sending an Internet control message protocol (ICMP) router advertisement message to the second computing device including a second set of network parameters for causing the virtual machine to become communicatively coupled to the VPN via a second attachment circuit, wherein the second set of network parameters are different from the first set of network parameters, and wherein the second attachment circuit couples the virtual machine to the PE routing device.

The destination computing device receives checkpoint data for the virtual machine, and resumes execution of the virtual machine from a state represented by the checkpoint data. Furthermore, the virtual machine subsequently receives the ICMP router advertisement message (206). In particular, the destination computing device receives the ICMP router advertisement message, and a hypervisor of the destination computing device directs the ICMP router advertisement message to the migrated virtual machine.

A guest operating system of the migrated virtual machine may then direct the ICMP router advertisement message to a particular application executing in an application space of the virtual machine, where the application includes mobility functionality whose task is to re-attach the guest operating system to the VPN. Accordingly, the application extracts the network parameters from the ICMP router advertisement message (208) and rebuilds a network stack of the guest operating system using the network parameters (210). In this manner, the virtual machine becomes attached to the attachment circuit to the PE router, and may thereby reestablish a communicative connection to the VPN (212).

In this manner, the method of FIG. 4 also represents an example of a method including, after execution of a virtual machine by a first computing device has stopped, wherein the virtual machine is communicatively coupled to a virtual private network (VPN) via a first attachment circuit using a first set of network parameters while executed by the first computing device, receiving, by a second computing device, checkpoint data for the virtual machine, executing, by the second computing device, the virtual machine using at least some of the checkpoint data, and causing the virtual machine to become communicatively coupled to the VPN via a second attachment circuit using a second set of network parameters different from the first set of network parameters.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

The invention claimed is:

1. A method comprising:

determining, by a second computing device, that a network management system (NMS) has initiated a virtual machine migration from a first computing device to the second computing device, wherein the virtual machine is communicatively coupled to a virtual private network (VPN) via a first attachment circuit using a first network stack based on a first set of network parameters while executed by the first computing device, and wherein the first set of network parameters contain data specific to the first network stack and the first attachment circuit, after execution of the virtual machine by the first computing device has stopped:

receiving, by the second computing device, checkpoint data for the virtual machine, wherein the checkpoint data is for use in restarting the virtual machine from when the virtual machine stopped;

executing, by the second computing device, the virtual machine using at least some of the checkpoint data;

receiving, by the second computing device, a message from a provider edge (PE) routing device to which the second computing device is communicatively coupled, wherein the message includes data specifying a second set of network parameters based on configuration data of the PE routing device, wherein the second set of network parameters is different from the first set of network parameters, wherein the second set of network parameters contain information regarding a second attachment circuit for reattaching a guest operating system of the virtual machine to the VPN, and wherein the PE routing device sends the message in response to a notification from the NMS that the virtual machine is to be migrated from the first computing device to the second computing device;

constructing, by the second computing device, a second network stack for the guest operating system of the virtual machine based on the second set of network parameters; and causing, by the second computing device, the virtual machine to become communicatively coupled to the VPN via the second attachment circuit using the second network stack, wherein the second attachment circuit is different than the first attachment circuit.

2. The method of claim 1, wherein the first attachment circuit comprises a first type of attachment circuit, and wherein the second attachment circuit comprises a second type of attachment circuit different from the first type of attachment circuit.

3. The method of claim 1, wherein when the second attachment circuit comprises a virtual local area network (VLAN), the second set of network parameters comprise VLAN tags and instructions for updating an address resolution protocol (ARP) cache of the guest operating system.

4. The method of claim 1, wherein when the second attachment circuit comprises a generic routing encapsulation (GRE) tunnel, the second set of network parameters comprise a home agent address of the PE routing device for the GRE tunnel, a protocol for the GRE tunnel, and a GRE session key.

5. The method of claim 4, wherein the second set of network parameters further comprise data representative of a new default gateway for the virtual machine.

6. The method of claim 1, wherein the second set of network parameters further comprise instructions for causing the guest operating system to re-authenticate the second type of attachment circuit to the VPN using an authentication protocol.

7. The method of claim 1, wherein receiving the message comprises receiving an Internet control message protocol (ICMP) router advertisement message.

8. The method of claim 1, wherein the message further includes an indication of a type for the second attachment circuit.

9. A computing device comprising:
a network interface; and
a control unit configured to:
determine that a network management system (NMS) has initiated a virtual machine migration from a separate computing device to the computing device, wherein the virtual machine is communicatively coupled to a virtual private network (VPN) via a first attachment circuit using a first network stack based on a first set of network parameters while executed by the separate computing device, and wherein the first set of network parameters contain data specific to the first network stack and the first attachment circuit,
after execution of the virtual machine by the separate computing device has stopped:
receive checkpoint data for the virtual machine, wherein the checkpoint data is for use in restarting the virtual machine from when the virtual machine stopped,
execute the virtual machine, using at least some of the checkpoint data,
receive a message from a provider edge (PE) routing device to which the computing device is communicatively coupled, wherein the message includes data specifying a second set of network parameters based on configuration data of the PE routing device, wherein the second set of network parameters is different from the first set of network parameters, wherein the second set of network parameters contain information regarding a second attachment circuit for reattaching a guest operating system of the virtual machine to the VPN, and wherein the PE routing device sends the message in response to a notification from the NMS that the virtual machine is to be migrated from the first computing device to the second computing device,
construct a second network stack for the guest operating system of the virtual machine based on the second set of network parameters, and
cause the virtual machine to become communicatively coupled, using the network interface, to the VPN via a second attachment circuit using the second network stack, wherein the second attachment circuit is different than the first attachment circuit.

10. The computing device of claim 9, wherein the first attachment circuit comprises a first type of attachment circuit, and wherein the second attachment circuit comprises a second type of attachment circuit different from the first type of attachment circuit.

11. The computing device of claim 9, wherein when the second attachment circuit comprises a virtual local area network (VLAN), the second set of network parameters comprise VLAN tags and instructions for updating an address resolution protocol (ARP) cache of the guest operating system.

12. The computing device of claim 9, wherein when the second attachment circuit comprises a generic routing encapsulation (GRE) tunnel, the second set of network parameters comprise a home agent address of the PE routing device for the GRE tunnel, a protocol for the GRE tunnel, and a GRE session key.

13. The computing device of claim 12, wherein the second set of network parameters further comprise data representative of a new default gateway for the virtual machine.

14. The computing device of claim 9, wherein the second set of network parameters further comprise instructions for causing the guest operating system to re-authenticate the second attachment circuit to the VPN using an authentication protocol.

15. The computing device of claim 9, wherein the message comprises an Internet control message protocol (ICMP) router advertisement message.

16. The computing device of claim 9, wherein the message further includes an indication of a type for the second attachment circuit.

17. The computing device of claim 9, wherein the virtual machine comprises one of a plurality of virtual machines, and wherein the control unit is further configured to execute a hypervisor that manages the plurality of virtual machines.

18. A computer-readable storage medium comprising instructions that, when executed, cause a processor of a computing device to: determine that a network management system (NMS) has initiated a virtual machine migration from a first computing device to the second computing device, wherein the virtual machine is communicatively coupled to a virtual private network (VPN) via a first attachment circuit using a first network stack based on a first set of network parameters while executed by the separate computing device, and wherein the first set of network parameters contain data specific to the first network stack and the first attachment circuit, after execution of the virtual machine by the first computing device has stopped:
receive checkpoint data for the virtual machine, wherein the checkpoint data is for use in restarting the virtual machine from when the virtual machine stopped;
execute the virtual machine using at least some of the checkpoint data;

receive a message from a provider edge (PE) routing device to which the computing device is communicatively coupled, wherein the message includes data specifying a second set of network parameters based on configuration data of the PE routing device, wherein the second set of network parameters is different from the first set of network parameters, wherein the second set of network parameters contain information regarding a second attachment circuit for reattaching a guest operating system of the virtual machine to the VPN, and wherein the PE routing device sends the message in response to a notification from the NMS that the virtual machine is to be migrated from the first computing device to the second computing device;

construct a second network stack for the guest operating system of the virtual machine based on the second set of network parameters; and cause the virtual machine to become communicatively coupled to the VPN via the second attachment circuit using the second network stack, wherein the second attachment circuit is different than the first attachment circuit.

19. The computer-readable storage medium of claim 18, wherein the first attachment circuit comprises a first type of attachment circuit, and wherein the second attachment circuit comprises a second type of attachment circuit different from the first type of attachment circuit.

20. The computer-readable storage medium of claim 18, wherein when the second attachment circuit comprises a virtual local area network (VLAN), the second set of network parameters comprise VLAN tags and instructions for updating an address resolution protocol (ARP) cache of the guest operating system.

21. The computer-readable storage medium of claim 18, wherein when the second attachment circuit comprises a generic routing encapsulation (GRE) tunnel, the second set of network parameters comprise a home agent address of the PE routing device for the GRE tunnel, a protocol for the GRE tunnel, and a GRE session key.

22. The computer-readable storage medium of claim 21, wherein the second set of network parameters further comprise data representative of a new default gateway for the virtual machine.

23. The computer-readable storage medium of claim 18, wherein the second set of network parameters further comprise instructions for causing the guest operating system to re-authenticate the second attachment circuit to the VPN using an authentication protocol.

24. The computer-readable storage medium of claim 18, wherein the instructions that cause the processor to receive the message comprise instructions that cause the processor to receive an Internet control message protocol (ICMP) router advertisement message.

25. The computer-readable storage medium of claim 18, wherein the message further includes an indication of the second attachment circuit.

26. A system comprising:
a first provider edge (PE) routing device that provides access to a virtual private network (VPN);
a second PE routing device that provides access to the VPN;
a network management system (NMS);
a first computing device coupled to the first PE routing device via a first attachment circuit, wherein the first computing device is configured to execute a virtual machine, wherein the virtual machine is communicatively coupled to the VPN via the first attachment circuit using a first network stack based on a first set of network parameters, and wherein the first set of network parameters contain data specific to the first network stack and the first attachment circuit; and a second computing device coupled to the second PE routing device via a second attachment circuit, wherein the NMS is configured to initiate a virtual machine migration from the first computing device to the second computing device and to send a first message to the second PE routing device indicating that the virtual machine has migrated to the second computing device, wherein the first computing device is configured to stop execution of the virtual machine and to create checkpoint data for the virtual machine, wherein the second PE routing device is configured to send, in response to the first message from the NMS that the virtual machine has migrated from the first computing device to the second computing device, a second message to the second computing device, the second message including a second set of network parameters for causing the virtual machine to become communicatively coupled to the VPN via the second attachment circuit, wherein the second set of network parameters are different from the first set of network parameters, and wherein the second set of network parameters contain information regarding the second attachment circuit for reattaching a guest operating system of the virtual machine to the VPN, and wherein, in response to the second message, the second computing device is configured to receive the checkpoint data for the virtual machine, wherein the checkpoint data is for use in restarting the virtual machine from when the virtual machine stopped, execute the virtual machine using at least some of the checkpoint data, receive the second message from the second PE routing device, construct a second network stack for the guest operating system of the virtual machine based on the second set of network parameters, and to cause the virtual machine to become communicatively coupled to the VPN via the second attachment circuit using the second network stack based on the second set of network parameters, wherein the second attachment circuit is different than the first attachment circuit.

27. The system of claim 26, wherein the first attachment circuit comprises a first type of attachment circuit, and wherein the second attachment circuit comprises a second type of attachment circuit different from the first type of attachment circuit.

28. The system of claim 26, wherein the message comprises an Internet control message protocol (ICMP) message.

29. The system of claim 26, wherein when the second attachment circuit comprises a virtual local area network (VLAN), the second set of network parameters comprise VLAN tags and instructions for updating an address resolution protocol (ARP) cache of the guest operating system.

30. The system of claim 26, wherein when the second attachment circuit comprises a generic routing encapsulation (GRE) tunnel, the second set of network parameters comprise a home agent address of the second PE routing device, a protocol for the GRE tunnel, and a GRE session key.

31. A method comprising:
receiving, by a provider edge (PE) routing device, a first message from a network management system (NMS) indicating that the NMS has initiated a virtual machine migration from a first computing device to a second computing device and that the virtual machine has migrated from the first computing device to the second computing device;

determining, by the PE routing device, that the virtual machine has migrated from the first computing device to the second computing device based on the first message, wherein the virtual machine is communicatively coupled to a virtual private network (VPN) via a first attachment circuit using a first network stack based on a first set of network parameters while executed by the first computing device, wherein the first set of network parameters contain data specific to the first network stack and the first attachment circuit, and wherein the PE routing device is communicatively coupled to the second computing device; and in response to determining that the virtual machine has migrated to the second computing device, sending, by the PE routing device, a second message to the second computing device including a second set of network parameters for causing the virtual machine to become communicatively coupled to the VPN via a second attachment circuit, wherein the second set of network parameters are different from the first set of network parameters, wherein the second set of network parameters contain information regarding the second attachment circuit for reattaching a guest operating system of the virtual machine to the VPN, wherein the second attachment circuit couples the virtual machine to the PE routing device, wherein sending the second message comprises configuring the second message to cause the second computing device to construct a second network stack for the guest operating system of the virtual machine based on the second set of network parameters and to cause the virtual machine to become communicatively coupled to the VPN via the second attachment circuit using the second network stack based on the second set of network parameters, and wherein the second attachment circuit is different than the first attachment circuit.

32. The method of claim 31, wherein the first attachment circuit comprises a first type of attachment circuit, and wherein the second attachment circuit comprises a second type of attachment circuit different from the first type of attachment circuit.

33. The method of claim 31, wherein the message comprises an Internet control message protocol (ICMP) router advertisement message.

* * * * *